US012038983B2

(12) United States Patent
Chang et al.

(10) Patent No.: US 12,038,983 B2
(45) **Date of Patent: *Jul. 16, 2024**

(54) INTELLIGENT CLUSTERING SYSTEMS AND METHODS USEFUL FOR DOMAIN PROTECTION

(71) Applicant: Proofpoint, Inc., Sunnyvale, CA (US)

(72) Inventors: Hung-Jen Chang, Fremont, CA (US); Gaurav Mitesh Dalal, Fremont, CA (US); Ali Mesdaq, San Jose, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,912

(22) Filed: Mar. 7, 2023

(65) Prior Publication Data

US 2023/0205823 A1 Jun. 29, 2023

Related U.S. Application Data

(63) Continuation of application No. 16/513,519, filed on Jul. 16, 2019, now Pat. No. 11,636,161.

(51) Int. Cl.

*G06F 16/90* (2019.01)
*G06F 16/901* (2019.01)
*G06F 16/906* (2019.01)

(52) U.S. Cl.

CPC ........ *G06F 16/906* (2019.01); *G06F 16/9027* (2019.01)

(58) Field of Classification Search

USPC .................. 707/999.003, 999.101, 737, 797
See application file for complete search history.

(56) References Cited

U.S. PATENT DOCUMENTS

| | | | | |
|---|---|---|---|---|
| 11,720,599 B1 * | 8/2023 | Lin | G06F 16/2246 707/738 |
| 2008/0046441 A1 * | 2/2008 | Wen | G06F 16/9027 |
| 2009/0234878 A1 * | 9/2009 | Herz | G06F 16/22 707/999.102 |
| 2012/0053983 A1 * | 3/2012 | Vittal | G06F 16/906 |

(Continued)

*Primary Examiner* — Son T Hoang

(74) *Attorney, Agent, or Firm* — SPRINKLE IP LAW GROUP

(57) ABSTRACT

An intelligent clustering system has a dual-mode clustering engine for mass-processing and stream-processing. A tree data model is utilized to describe heterogenous data elements in an accurate and uniform way and to calculate a tree distance between each data element and a cluster representative. The clustering engine performs element clustering, through sequential or parallel stages, to cluster the data elements based at least in part on calculated tree distances and parameter values reflecting user-provided domain knowledge on a given objective. The initial clusters thus generated are fine-tuned by undergoing an iterative self-tuning process, which continues when new data is streamed from data source(s). The clustering engine incorporates stage-specific domain knowledge through stage-specific configurations. This hybrid approach combines strengths of user domain knowledge and machine learning power. Optimized clusters can be used by a prediction engine to increase prediction performance and/or by a network security specialist to identify hidden patterns.

20 Claims, 10 Drawing Sheets

(56) References Cited

U.S. PATENT DOCUMENTS

| | | | | |
|---|---|---|---|---|
| 2016/0042253 | A1* | 2/2016 | Sawhney | G06F 16/54 |
| 2018/0210945 | A1* | 7/2018 | Kasthuri | G06F 16/282 |
| 2019/0102155 | A1* | 4/2019 | Garvey | G06F 16/906 |
| 2020/0387743 | A1* | 12/2020 | Wick | G06F 16/2228 |

* cited by examiner

| engine params | clus_algo | batch_size | clus_split_th | clus_merge_th | clus_dist_dd_th_1 | clus_dist_dd_th_2 | order_by | | | | | | |
|---|---|---|---|---|---|---|---|---|---|---|---|---|---|
| | 3 | 200 | 0.8 | 0.2 | 0.29 | 0.29 | f7 time | | | | | | |
| | | | | | | | | | | | | | |
| included feature | | | | | | | | | x | | p | x | |
| feature name | classification_date | category | seed | domain | state | mx_state | convict | created_date | ip_asn | dns_ipaddress | registrant_email | registrar_name | ... |
| distance type | str_cmp | str_cmp | str_cmp | ngrams_dist | str_cmp | str_cmp | str_cmp | date_dist | str_cmp | ip_dist | set_of_eml_dist | registrar_name_str_cmp | ... |
| distance factor | 0 | 1 | 1 | 1 | 0 | 0 | 0 | 1 | 1 | 1 | 3 | 1.5 | ... |
| not signif sample | | | | | | | | | | | (in, "@" or ".") | | |
| signif cluster 1 | | | | | | | (==, 1) | | | | | | |
| signif cluster 2 | (==, f4[1]) | (==, f4[2 and f5[1]) | | | | | | | | | | | |
| bundle dist factor | | | | | | | | | 2 | | 3 | | |
| bundle dist factor | | | | | | | | | 3 | | 3 | 3 | |

| SEED | DOMAIN | IP ASN | DNS IP ADDRESS | REGISTRANT EMAIL | REGISTRANT NAME | GA TRACKER ID |
|---|---|---|---|---|---|---|
| company.com | wwwcrosscompanytcpa.com | 99999 | 185.00.222.6 | 4stones@123.com | 99net, Inc. | |
| company.com | crosscompanyttcpa.com | | | 4stones@123.com | 99net, Inc. | |
| company.com | markoscompanytcpa.com | | | 4stones@123.com | 99net, Inc. | |
| company.com | croscompanytcpa.com | 99999 | 185.00.221.7 | 4stones@123.com | 99NET, Inc. | |
| company.com | markoscompanytcpa.com | | | 4stones@123.com | 99net, Inc. | |
| company.com | crosscompanytcpa.com | | | 4stones@123.com | 99net, Inc. | |
| company.com | lutercompanytcpa.com | 99999 | 185.00.221.7 | 4stones@123.com | HiChina Tech | |
| company.com | mrkoscompanytcpa.com | | | 4stones@123.com | 99net, Inc. | |

| SEED | DOMAIN | IP ASN | DNS IP ADDRESS | REGISTRANT EMAIL | REGISTRANT NAME | GA TRACKER ID |
|---|---|---|---|---|---|---|
| enterprise.com | enterpriseim.dk | 22999 | 170.60.1.200 | | | UA-999999-9 |
| enterprise.com | enterpriseim.nl | 22999 | 170.60.1.200 | | Monitor Inc. | UA-999999-9 |
| enterprise.com | enterpriseim.ie | 22999 | 170.60.1.200 | | | UA-999999-9 |
| enterprise.com | enterpriseim.com.br | 22999 | 170.60.1.200 | | | UA-999999-9 |
| enterprise.com | enterpriseim.it | 22999 | 170.60.1.200 | | Monitor Ltd. | UA-999999-9 |
| enterprise.com | enterpriseim.cl | 22999 | 170.60.1.200 | | | UA-999999-9 |
| enterprise.com | enterpriseim.se | 22999 | 170.60.1.200 | | | UA-999999-9 |
| enterprise.com | enterpriseim.be | 22999 | 170.60.1.200 | | Monitor Inc. | UA-999999-9 |
| enterprise.com | enterpriseim.pt | 22999 | 170.60.1.200 | cops@monitor.com | Monitor Inc. | UA-999999-9 |

| SEED | DOMAIN | IP ASN | DNS IP ADDRESS | REGISTRANT EMAIL | REGISTRANT NAME | GA TRACKER ID |
|---|---|---|---|---|---|---|
| company.com | lustercomopanytpa.com | 69666 | 185.00.221.7 | | HiChina Tech | |
| enterprise.com | mnenterprise.com | 69666 | 185.00.221.7 | Yin@SiBaoHu.com | HiChina Tech | |
| company.com | lustercomopanytpa.com | 69666 | 185.00.221.7 | 4stones@123.com | HiChina Tech | |
| company.com | croscompanytcp.com | 69666 | 185.00.221.7 | Yin@SiBaoHu.com | HiChina Tech | |
| company.com | compeny.com | 69666 | 185.00.221.7 | 4stones@123.com | HiChina Tech | |
| company.com | companyresearch.com | 69666 | 185.00.221.7 | 4stones@123.com | HiChina Tech | |
| company.com | pathcompanytcpa.com | 69666 | 185.00.221.7 | 4stones@123.com | HiChina Tech | |
| company.com | companyactivatecard.com | 69666 | 185.00.221.7 | 4stones@123.com | HiChina Tech | |

| SEED | DOMAIN | IP ASN | DNS IP ADDRESS | REGISTRANT EMAIL | REGISTRANT NAME | GA TRACKER ID |
|---|---|---|---|---|---|---|
| store.com | store-com-update-login.com | | | SAD@LOL.COM | 1stDomain Inc. | |
| store.com | store-com-login-alert.com | | | ASAD@LOL.COM | 1stDomain Inc. | |
| store.com | store-com-login-secure.com | | | DSAD@LOL.COM | 1stDomain Inc. | |
| store.com | store-com-update-2017.com | | | SAD@LOL.COM | 1stDomain Inc. | |
| store.com | store-com-system-new.com | | | ASAD@LOL.COM | 1stDomain Inc. | |
| store.com | store-com-update-info.com | | | DSAD@LOL.COM | 1stDomain Inc. | |
| store.com | store-com-welcome0go.com | | | DSAD@LOL.COM | 1stDomain Inc. | |
| store.com | store-com-gold-level.com | | | ASAD@LOL.COM | 1stDomain Inc. | |
| store.com | store-com-unauthorize.com | | | SSAD@LOL.COM | 1stDomain Inc. | |
| store.com | store-com-atm-sign-in1.com | | | DSAD@LOL.COM | 1stDomain Inc. | |
| store.com | store-com-support.com | | | ASAD@LOL.COM | 1stDomain Inc. | |
| store.com | store-com-new-year.com | | | SSAD@LOL.COM | 1stDomain Inc. | |
| store.com | store-com-new-update.com | | | DSAD@LOL.COM | 1stDomain Inc. | |

INTELLIGENT CLUSTERING SYSTEMS AND METHODS USEFUL FOR DOMAIN PROTECTION

CROSS-REFERENCE TO RELATED APPLICATION(S)

This is a continuation of, and claims a benefit of priority from, U.S. Patent Application Ser. No. 16/513,519, filed Jul. 16, 2019, issued as U.S. Pat. No. 11,636,161, entitled "INTELLIGENT CLUSTERING SYSTEMS AND METHODS USEFUL FOR DOMAIN PROTECTION," which is fully incorporated by reference herein for all purposes.

TECHNICAL FIELD

This disclosure relates generally to network security and domain protection. More particularly, this disclosure relates to intelligent clustering systems and methods for discovery of network security information hidden in large sets of data, useful for providing domain protection in a scalable and timely manner.

BACKGROUND OF THE RELATED ART

Network security refers to the protection of a computer network or domain against cyberattacks. A cyberattack is any attempt to expose, alter, disable, destroy, steal, or gain unauthorized access to, or make unauthorized use of data, software, hardware, resource, or component of the computer network or domain. Advanced persistent threats (APTs) and malware are example types of cyberattacks.

A common challenge faced by network security analysts is the enormous amount of data that must be analyzed, often manually. Even when assisted by modern network security technologies such as firewalls, network security analysts generally rely on their domain knowledge and subject matter expertise to identify potential threats and sources of cyberattacks.

The heterogenous nature of the massive amount of data also presents many technical challenges. For example, the massive amount of data collected by network devices can have no particular data structure and/or data format. Further, the disparate nature of these network devices means that data thus collected can have distinctively different attributes, formats, and/or types. For instance, a network security monitoring system may collect event reports on a computer network, while a network security appliance installed on the same computer network may collect external Internet Protocol (IP) addresses requesting access to resources on the computer network. Yet another network device such as a gateway or a proxy server may store network traffic information in a text-based log file. These and other technical challenges make it extremely difficult for a network security analyst to efficiently, effectively, and timely identify potential threats and sources of cyberattacks even with domain knowledge and subject matter expertise.

Recently, researchers suggested exploring automated clustering techniques that help identify data samples exhibiting similar behavior or common patterns. Such an automated clustering approach generally allows a network security analyst to discard data samples which were not qualified to form a cluster. Unfortunately, previous techniques used to implement this approach usually rely directly on academic clustering algorithms without first solving the intrinsic technical problems about restrictions and requirements in engineering. For example, as described above, in practice, the data volume that needs to be analyzed can be massive; the data receiving rate can be very high; the data types are heterogeneous; the data availability varies; the data relation between samples can be dynamic; the sample label may be unavailable; sample data can be incomplete; the number of clusters is unknown and changing; the cluster shape is unknown and varying; one sample belongs to either just one cluster or multiple clusters. As a result, previous techniques often do not scale well to process a huge volume of data and/or frequently fail to sufficiently generalize the observed data samples so as to correctly, efficiently, and timely recognize a meaningful cluster from the observed data samples.

SUMMARY

An object of the invention is to provide an intelligent clustering technology that can solve the intrinsic technical problems concerning restrictions and requirements in engineering and that can scale well to process a huge volume of data and sufficiently generalize observed data elements ("samples") so as to correctly, efficiently, and timely recognize a meaningful cluster from the observed samples. Clusters thus generated can be used to uncover hidden patterns and structures in large sets of data. By uncovering hidden patterns and structures in large sets of data, the intelligent clustering technology described herein can facilitate network security analysts or specialists in identifying indicators of cyberattacks and attacks that usually remain hidden and undetectable. For example, the intelligent clustering technology described herein can facilitate network security analysts or specialists in identifying brand threat actors, discovering APT campaign, detecting non-HTTP malware families, and clustering relevant or irrelevant domains. While embodiments disclosed herein described domains as data elements of interest, skilled artisans can appreciate that the scalable, intelligent clustering architecture, systems, and methods disclosed herein are adaptive to be applied to other types of data elements. Thus, the examples described herein are meant to be illustrative and non-limiting.

In some embodiments, an intelligent clustering system can be characterized as a dual-mode system in that the intelligent clustering system has a mass-processing mode and stream-processing mode. The intelligent clustering system includes a data modeling module can precisely describe heterogenous input data, a distance modeling module that leverages various known or user-defined mathematical distance functions to model and measure similarity between feature values, and an editable configuration module that enables users to define features and set their parameter values. Internally, the intelligent clustering system includes a clustering engine with an element clustering module, a cluster tuning module, and a mechanism for semi auto-labeling and label-correcting.

In some embodiments, the data modeling module receives sample data from data sources and prepares tree data models ("feature trees") according to the parameter values provided through the configuration editing module. The distance modeling module receives the feature trees from the data modeling module and calculates the distances between the feature trees according to the instructions from the configuration editing module. In the mass-processing mode, the clustering module groups similar feature trees together by analyzing the similarity matrix from the distance values between the features provided by the distance modeling module, checking the cluster integrity, and applying the domain-related knowledge provided through the configuration editing module. In the stream-processing mode, the element clustering module can assign a new data element to an existent cluster by comparing the distance values, or to a newly cluster if it cannot find one close enough. In addition, the element clustering module keeps updating the cluster representatives whenever there is a cluster content change, and pass the clustering result to the cluster tuning module. Taking a hybrid approach which combines user input and machine learning, the cluster tuning module fine tunes the clustering result according to previous clustering result from the element clustering module or itself (the cluster tuning module), and the domain-related knowledge provided through the configuration editing module. The cluster tuning module then compares distances, checks the cluster integrity, applies domain knowledge, moves a data element across clusters, merges clusters, calculates cluster representatives, and reports the final clustering result after the iteration stops. The iteration stops when the number of data moving and the number of cluster merging reach to a stationary point. The clustering engine then waits for new data to arrive and continues in a stream-processing mode.

One embodiment may comprise a system having a processor and a memory and configured to implement an intelligent clustering method disclosed herein. One embodiment may comprise a computer program product that comprises a non-transitory computer-readable storage medium which stores computer instructions that are executable by a processor to perform the intelligent clustering method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 6 shows an example of a configuration with user-defined parameter values reflecting domain knowledge input to an intelligent clustering system according to some embodiments disclosed herein.

FIGS. 7-10 show examples of various clustering results produced by an intelligent clustering system according to some embodiments disclosed herein.

DETAILED DESCRIPTION

Figure 1:
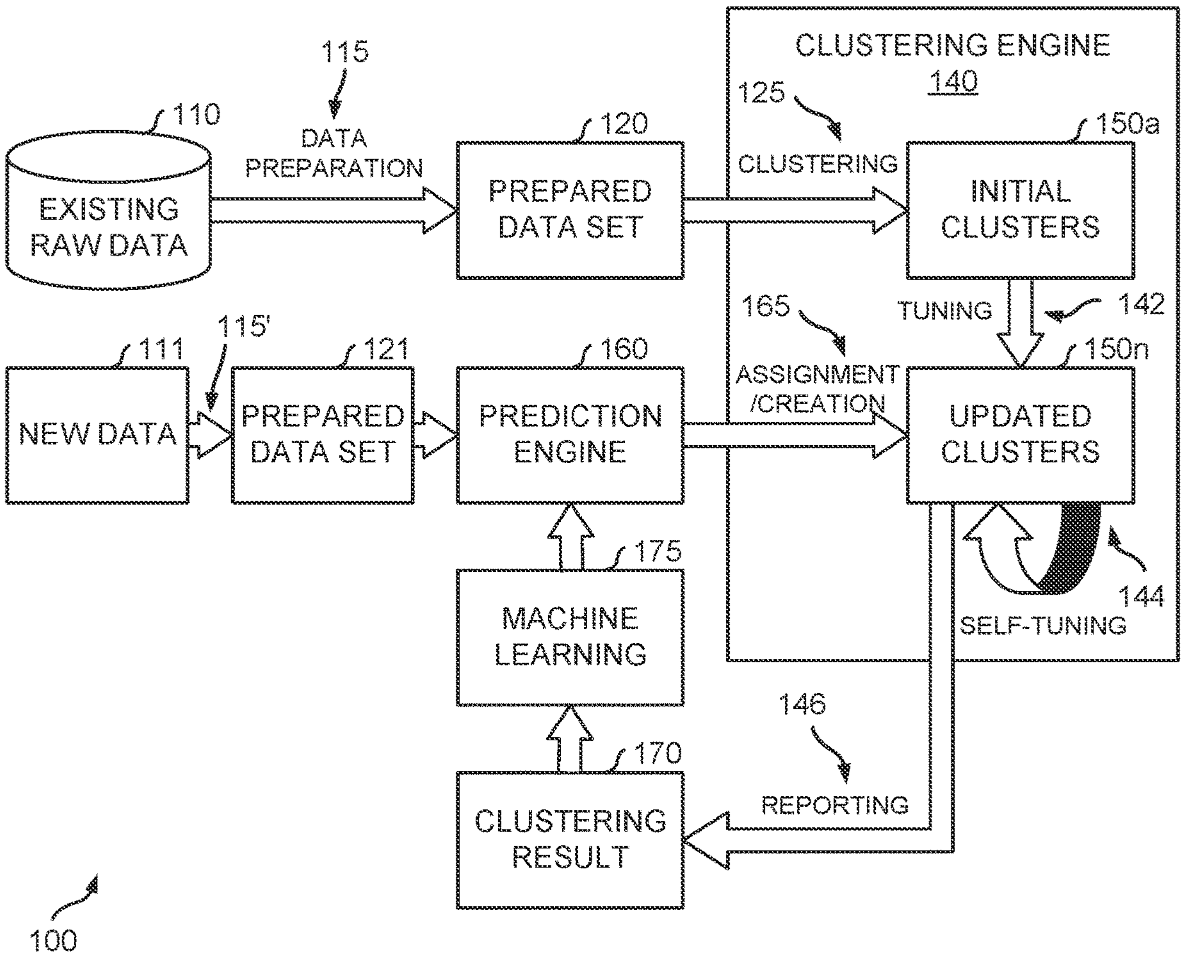
FIG. 1 depicts a diagrammatic representation of an example of an intelligent clustering system implementing a scalable clustering architecture disclosed herein according to some embodiments disclosed herein.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

A goal of this disclosure is to efficiently process a huge influx of data (e.g., through a data stream) having heterogeneous data types, and intelligently and effectively group or cluster them according to a given objective. In embodiments disclosed herein, this goal is accomplished in a scalable clustering architecture on which an intelligent clustering system can operate in two different modes ("dual-mode") to perform clustering workflows and processes to achieve a quality clustering result in a highly scalable way. This scalable clustering architecture implements a modular approach that can be described as follows.

Scalable Clustering Architecture

The scalable clustering architecture enables a dual-mode clustering system to run in a mass-processing mode and/or a stream-processing mode. In the stream-processing mode, the dual-mode clustering system does not have to first collect a massive amount of data, wait for the completion of the data collection, and then start to process the massive amount of data. If the data arrival rate is not faster than the data processing rate, this modular approach makes a nearly real-time analysis possible, eliminates the need to wait for the completion of a big data collection operation, and allows processing of the data to proceed before the big data collection operation is complete. In computing, "big data" is a technical field that concerts extremely large data sets that may be analyzed computationally to reveal patterns, trends, and associations, especially relating to human behavior and interactions. Such a large volume of data sets is considered too massive or complex for traditional data processing techniques and applications.

With a dual-mode approach, the time complexity can be significantly reduced. For instance, using big O notation known to those skilled in computer science, the time complexity becomes O(ML) or O(MN) after an intelligent clustering system disclosed herein finishes processing given historical samples through mass-processing. Here, M is the dimension of all leaf-node features, N is the number of samples in the clusters, and L is the number of current clusters. As explained below, this reduction in time complexity is made possible at least because of a novel tree data model through which heterogenous data elements can now be described in a uniform, consistent way.

In this disclosure, a data element refers to a data entity that can be described by a plurality of associated features of interest (e.g., properties, attributes, pieces of metadata, and so on about the data entity). Such features of interest can be predefined (e.g., by a domain expert or a user with domain knowledge). As a non-limiting example, a data element can have the following features: a classification date, a category, a seed indicator, a domain name, a state, a mail exchange (MX) state, a creation date, an Internet Protocol (IP) Autonomous System Number (ASN), a final IP address, a Domain Name System (DNS) IP address, a registrant email address, a registrar name, a disposable email address, a free email address, a name server host name, a name server IP address, a MX record identifier (ID), a GOOGLE ANALYTICS (GA) tracker ID, a privacy flag, a phishing tag, a web status, a discount string, a page title, a logo flag, etc.

Relationships between and among features of a data element are often nonlinear and unstructured. A user with domain knowledge can describe these features and their relationships (e.g., feature A is a primary feature of data element X, feature B is associated with feature C, etc.) in the form of parameter values and provide them to the intelligent clustering system (e.g., through a user interface). Based at least on these parameter values, the intelligent clustering system can generate a tree data model with nodes and relationship paths where the nodes represent the features and/or bundled features and where the relationship paths represent the non-linear relationships between and among the features. Because the features themselves can have heterogenous data types, each node can be associated with a distance type that dictates a distance function to be used in distance calculations. Accordingly, once the intelligent clustering system disclosed herein finishes processing given historical samples in the mass-processing mode, the running time and space complexity can become roughly constant, and limited to the dimension of all leaf-node features (M) and the number of current clusters (L) or to the dimension of all leaf-node features (M) and the number of samples in the clusters (N), since data aging out will be kicked in to compensate the input data size growth.

In some embodiments, the intelligent clustering system can have a clustering engine that can perform massively parallel processing in the mass-processing mode. The massively parallel processing can begin with processing a certain volume of historical samples stored in a big data storage and forming some initial clusters. The big data storage is a storage infrastructure that is designed specifically to store, manage, and retrieve massive amounts of data (i.e., big data).

After a sufficiently large set of initial clusters are formed, new data elements can be used to inform cluster assignments of previously clustered data elements. As discussed in further detail below, new data elements can be ingested into the intelligent clustering system on-the-fly. As the intelligent clustering system receives new data elements in a data stream, the intelligent clustering system is operable to predict and cluster the new data elements one after another in the stream-processing mode. The prediction result can be used by the clustering engine to perform self-tuning—to re-form, update, or modify the existing clusters (e.g., the initial clusters generated in the mass-processing mode) based on overall dataset changes. For instance, newly received data elements can be added to one or more existing clusters or the newly-created cluster, or may trigger the splitting of existing clusters, and regrouping/clustering of data elements based on their features.

In some embodiments, there may not be historical data that can be used to generate initial clusters in the mass-processing mode. In such cases, the scalable clustering architecture enables an intelligent clustering system to operate in a stream-processing mode only. As a non-limiting example, the intelligent clustering system can involve an aging-out process, which will remove too old samples in clusters when the intelligent clustering system approaches its processing and/or memory limitation.

In some embodiments, there may not be a need to process data streams in real time. In such cases, the scalable clustering architecture enables an intelligent clustering system to operate in a mass-processing mode only. An example of an intelligent clustering system that can operate in a mass-processing mode, a stream-processing mode, or both is further described below with reference to FIGS. 1 and 2.

In the mass-processing mode, the intelligent clustering system can support a sequential clustering mode or a parallel clustering mode. Which clustering mode to use is dependent on the need of an application itself and thus can vary from implementation to implementation. An example of a sequential clustering method is further described below with reference to FIG. 3. An example of a parallel clustering method is further described below with reference to FIGS. 4A-4B.

In the sequential clustering mode, there are multiple stages of processing. Each stage has an associated stage-specific configuration which contains domain knowledge and stage-specific parameters, settings, rules, etc. Data elements that do not qualify (according to the stage-specific configuration) to be a member of any cluster at the current stage are carried over to the next stage for further clustering. At the next stage, a different stage-specific configuration is applied. For example, an implementation of an intelligent clustering system configured for uncovering hidden brand threats (i.e., potential threats to a brand-owned domain, referred to herein as a "seed domain") can operate in the sequential clustering mode to perform brand threat clustering in five stages. According to domain knowledge, a configuration for each individual stage is applied for clustering one after one. Thus, in this example implementation, there can be five different stage-specific configurations.

An example of sequential clustering is described below with reference to FIG. 3. Sequential clustering can be useful in finding meaningful data elements that cluster around a specific target. For instance, in the above example, each of the five different stage-specific configurations can incorporate domain knowledge particular to the seed domain. As the intelligent clustering system proceeds with each stage, it can automatically separate insignificant clusters from significant clusters and label them based on user-provided domain knowledge. In this way, the intelligent clustering system can identify clusters of data elements that are meaningful to the given objective (which, in this case, can be identifying threats such as questionable domains that cluster around the seed domain). In the sequential clustering mode, the intelligent clustering system continuously processes the raw data stored in the big data storage until all the data has been processed or until it reaches the end of the predefined number of stages.

In the parallel clustering mode, data elements are clustered in parallel based on different configurations and passed to their individual clustering stages accordingly. More specifically, initially, multiple configurations are run parallelly. Each clustering result thus generated by the clustering engine is provided for user review and labeling. The user input of label information (which is based on domain knowledge) can be included as a new feature or features. The new feature or features are provided as input to the clustering engine which utilizes the new feature or features to perform another clustering operation. This refines or otherwise optimizes the first clustering result and creates another clustering result. The clustering engine can then check the significance of each cluster in the second clustering result. If a cluster is determined to be significant (e.g., based on a user-defined parameter value or rule on cluster significance), it is stored.

Parallel clustering can be useful in finding meaningful clusters from the same input data for different purposes. For example, to find relevant domains for five seed domains, the intelligent clustering system can operate in the parallel clustering mode to perform relevant domain clustering based on five configurations, each containing domain knowledge of a particular seed domain. The same data elements can be clustered separately in parallel.

Figure 5:
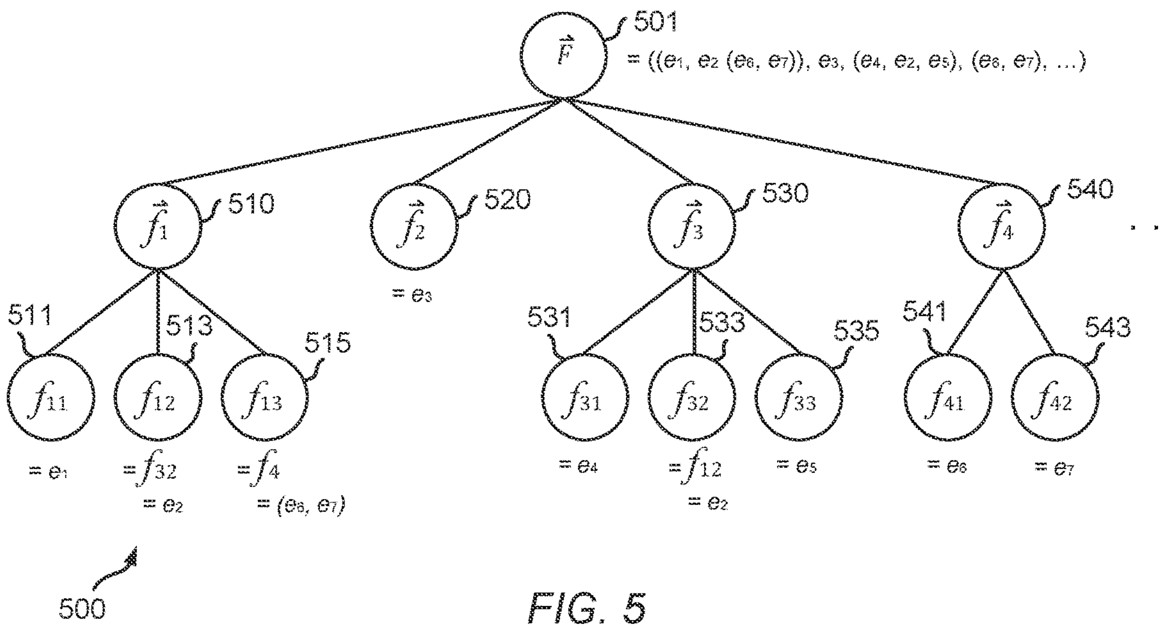
FIG. 5 depicts a diagrammatic representation of an example of a tree data model utilized by an intelligent clustering system disclosed herein to describe heterogenous input data according to some embodiments disclosed herein.

As alluded to above, the intelligent clustering system disclosed herein implements a novel tree data model through which heterogenous data elements can be described in a uniform, consistent way. The tree data model is a nonlinear tree data structure (which is also referred to herein as a "feature tree") having nodes representing features of a data element and relationships paths representing relationships between and among the features, including nested relationships. For each data element, the intelligent clustering system is operable to generate a feature tree that describes the features and the hierarchical or nested relationships between and among that data element's features. An example of a three-level tree data model is shown in FIG. 5. Feature trees can have different hierarchical levels and/or nested relationships.

In some embodiments, a feature tree has a root node that points to a set of user-defined features, each of which is represented in the feature tree as a node that points to a set of sub-trees of user-defined features of interest (e.g., properties or attributes of a data element such as a domain represented by the feature tree), if any. Each node in the feature tree, except its root node, is associated with a weight for calculating a feature-weighted distance between feature trees representing different data elements. In addition, each leaf node (which represents a user-defined feature of interest) is associated with a comparison type (which can also be referred to herein as a distance type). The comparison type, which can have a user-defined parameter value, can dictate what distance function should be utilized to calculate a distance between corresponding leaf nodes of the feature trees being compared.

The intelligent clustering system disclosed herein can be configured for supporting a variety of comparison functions. For example, the following equation can be used to calculate a distance between two feature trees with deepest node depth=2:

$$\Sigma_{i=0}\{Wgt_i*[\Sigma_{j=0}(Wgt_{ij}*\mathrm{FtFD}_{ij})]\}$$

where Wgt represents "weight"; ij represents the jth child node at depth=2 of the ith child node at depth=1 of the root node (depth=0) in a feature tree; and FtFD represents "feature-to-feature distance" between feature trees representing the corresponding data elements.

To calculate the feature-to-feature distance (FtFD), various distance functions can be utilized. Examples of different types of distance functions that can be utilized can include, but are not limited to:

- Number to Number (set/list) distance functions (e.g., absolute (Abs) distance function, ratio distance function, etc.).
- Text to Text distance functions (e.g., String-2-String (set/list) distance such as string distance function, Is-In function, Synonym-2-Synonm distance function, Edit distance function, ssdeep distance function; IP-2-IP (set/list) distance function; Date-2-Date (set/list) distance function; Email_Addr-2-Email_Addr (set/list) distance function; Domain-2-Domain (set/list) distance function; GA_Tracker_Id-2-GA_Tracker_Id distance function; Ngram-2-Ngram distance function; shingles (substring) distance function; Minhash-Signatures distance function; and so on).
- Image to Image ("Img") distance functions (e.g., RGB-Img distance function, Greyscale-Img distance function, etc.).

In some embodiments, the intelligent clustering system can provide distance function templates for users to implement custom distance functions particular to their objectives.

In implementation, there can be variations in how the intelligent clustering system evaluates a clustering result, a score associated with a cluster can be calculated based on a mean value of distances between all data elements in the cluster and its cluster representative, or between different data elements in the cluster (i.e., how similar or different are the data elements forming the cluster). A cluster representative has the same form of sample feature tree. It can be a genialized centroid/medoid of cluster. Based on mean, mode or median of all feature trees in a cluster for each individual leaf node, the corresponding leaf node value of cluster representative is defined.

The distance between two corresponding nodes in two feature trees representing two data elements can be, for example, a weighted p-norm, entropy based distance, etc. As a non-limiting example, using the bottom-up and left-corner traversal algorithm, a data preparation module in the cluster engine can calculate and aggregate distances between corresponding nodes in the feature trees to determine a distance between the two data elements.

In addition to the nonlinear data modeling aspect, the scalable clustering architecture further provides a configuration editing module through which users can define, specify, modify, edit, or otherwise manage features for a particular objective or application (e.g., brand threats clustering, relevant domain clustering, etc.). For example, a user can select distance calculation methods between leaf nodes (which represent primitive features) of different data elements, set weight values for the distance calculation between the leaf nodes, and so on. In this way, users can model the relationships between and among the data elements.

Through the configuration editing module, users can further define bundled features to set feature relations. The weight for a feature may then become dynamic and dependent on the values of other features during runtime. In this way, users can model the relationships between and among the features.

In some embodiments, the configuration editing module is accessible over a network through a user interface (UI). A user can input his or her domain knowledge to the configuration editing module through the UI. For example, the UI may provide interactive UI elements for setting up rules to define insignificant samples and significant clusters based on function of the feature values. In this way, the scalable clustering architecture can provide a hybrid clustering-engine solution in which user domain knowledge can be leveraged or combined with machine learning based clustering technologies.

Intelligent Clustering System

An example of an intelligent clustering system implementing the scalable clustering architecture described above will now be described with reference to FIG. 1.

In the example of FIG. 1, intelligent clustering system 100 includes a big data storage 110 storing existing raw data containing historical samples. As a non-limiting example, the historical samples can be domain name registration information obtained and/or received periodically and/or on-demand from a proprietary database of domain name data, and/or from a publicly accessible system, such as a WHOIS database. Big data storage 110 can be updated periodically or on-demand such that the domain name registration information is current and up to date. In this example, a data element (e.g., a "domain") stored in data storage 110 can be associated with a domain name described by a plurality of domain attributes including, but not limited to, at least one of a registration date of the domain name, a registrar ID associated with the domain name, a public or private registration designation for the domain name, a registration email address associated with the domain name, etc.

In the example of FIG. 1, intelligent clustering system 100 includes a data preparation process 115 that is operable to retrieve the raw data from big data storage 110 and process the raw data into prepared data set 120 for input into a clustering engine 140.

In some embodiments, data preparation process 115 can include preparing/formatting the raw data into an input format supported by clustering engine 140. This preparing/formatting operation can include performing a normalization or standardization to transform the raw data from one format to the input format supported by clustering engine 140. This transformation process can include modifying, abbreviating, and/or pre-classifying attributes, properties, or any features of interest associated with a domain.

In some embodiments, data preparation process 115 can further include enriching the raw data. This enriching process can include adding additional attribute information that includes, but is not limited to, at least one of a hosting IP address, a GA ID, an ASN identifier, a resolved (domain-to-IP) address, a page title, etc. In some embodiments, enriching the raw data can further include associating a domain name with metadata for a particular customer or industry sector, such as a corporate client, or attributes relevant to a particular industry, such as the healthcare industry. In some embodiments, the additional attribute information for the domain can be appended to the raw data directly as metadata that describe the domain. In some embodiments, the additional attribute information can be associated with the domain through a table, a relational database, etc.

In some embodiments, the output from data preparation process 115 (i.e., prepared data set 120) is provided to clustering engine 140. In turn, clustering engine 140 is operable to perform a clustering process 125 on prepared data set 120. Clustering process 125, which is further described below, analyzes prepared data set 120 based on features that are automatically identified, or that are indicated by a user or administrator (e.g., a cyber-security domain expert), and generates preliminary or initial clusters 150*a*.

In some embodiments, cluster formation can be performed by automatically identifying common features between different domains and grouping (clustering) elements that share a high degree of feature overlap, e.g., to form domain clusters. As such, domain clusters represent sets of domains that share a certain degree of feature overlap. Generally, different data elements belonging to a common cluster share a greater degree of feature similarity (overlap) as compared to different data elements belonging to different clusters. Similarities and/or differences between features of different data elements (i.e., the amount/degree of feature overlap) can depend on the relative importance (weight) of the features used for comparison. As discussed in further detail below, the clustering process can also be informed by user expertise and/or domain knowledge, such as through the manual identification of features that should be given primacy when cluster processing is performed.

As illustrated in FIG. 1, initial clusters 150*a* generated by clustering engine 140 then undergo a tuning process 142 for clustering optimization. In turn, tuning process 142 produces updated clusters 150*n*, which may involve newly received data 111 undergoing an iterative self-tuning process 144. This iterative self-tuning process 144 is further described below.

New data 111 can be prepared in a data preparation process 115' that is similar to data preparation process 115 described above. Data preparation process 115' produces a prepared data set 121 which is continuously automatically processed by a prediction engine 160.

Prediction engine 160 has been trained, using any suitable machine learning 175 technique, to recognize and cluster data elements from prepared data set 121 into existing cluster(s) and/or a new cluster. (Or, calculate the distances between a new data feature tree and the representative feature tree of each cluster to determine the right assignment and/or new cluster creation.) Output 165 from prediction engine 160 (e.g., cluster assignment and/or creation by prediction engine 160) can then be used by clustering engine 140 to fine tune (optimize) its clusters (e.g., moving domain elements among clusters, splitting clusters and/or merging clusters to form new clusters, in view of the similarities of domain attributes contained in cluster assignment and/or creation 165).

In some embodiments, iterative self-tuning process 144 ends when a condition is met (e.g., when number of splitting and number of merging for all samples at the moment are smaller than certain thresholds or reach their stationary points in minima, when a timer expires, etc.). In turn, iterative self-tuning process 144 outputs an optimized clustering result 170.

In some embodiments, a reporting function or process 146 can provide optimized clustering result 170 to a client device and/or prediction engine 160. Prediction engine 160 can learn from optimized clustering result 170 and improve its prediction performance (e.g., to increase the accuracy rate in generating cluster assignment predictions). For instance, if prediction engine 160 predicted domain A belongs to cluster X, but optimized clustering result 170 shows that domain A actually ended up in cluster Y, prediction engine 160 can adjust its prediction parameters based on the feedback it gets from clustering engine 140 through optimized clustering result 170.

In some embodiments, prediction engine 160 can be trained using one of a variety of machine learning libraries. By way of example, prediction engine 160 can implement one or more algorithms, including but are not limited to: Logistic Regression, Stochastic Gradient Decent, Naïve Bayes Classifier, Support Vector Machine, Decision Trees, Boosted Trees, Random Forest, Neural Networks, Nearest Neighbor, Passive Aggressive Regressor, etc. In some embodiments, machine learning models can employ a clustering algorithm (e.g., a Mini-batch K-means clustering algorithm), a recommendation algorithm (e.g., a Miniwise Hashing algorithm, an Euclidean LSH algorithm, etc.), and/or an anomaly detection algorithm, such as a Local outlier factor. Additionally, machine learning models can employ a dimensionality reduction approach, such as, one or more of: a mini-batch Dictionary Learning algorithm, an Incremental Principal Component Analysis (PCA) algorithm, a Latent Dirichlet Allocation algorithm, etc.

Figure 2:
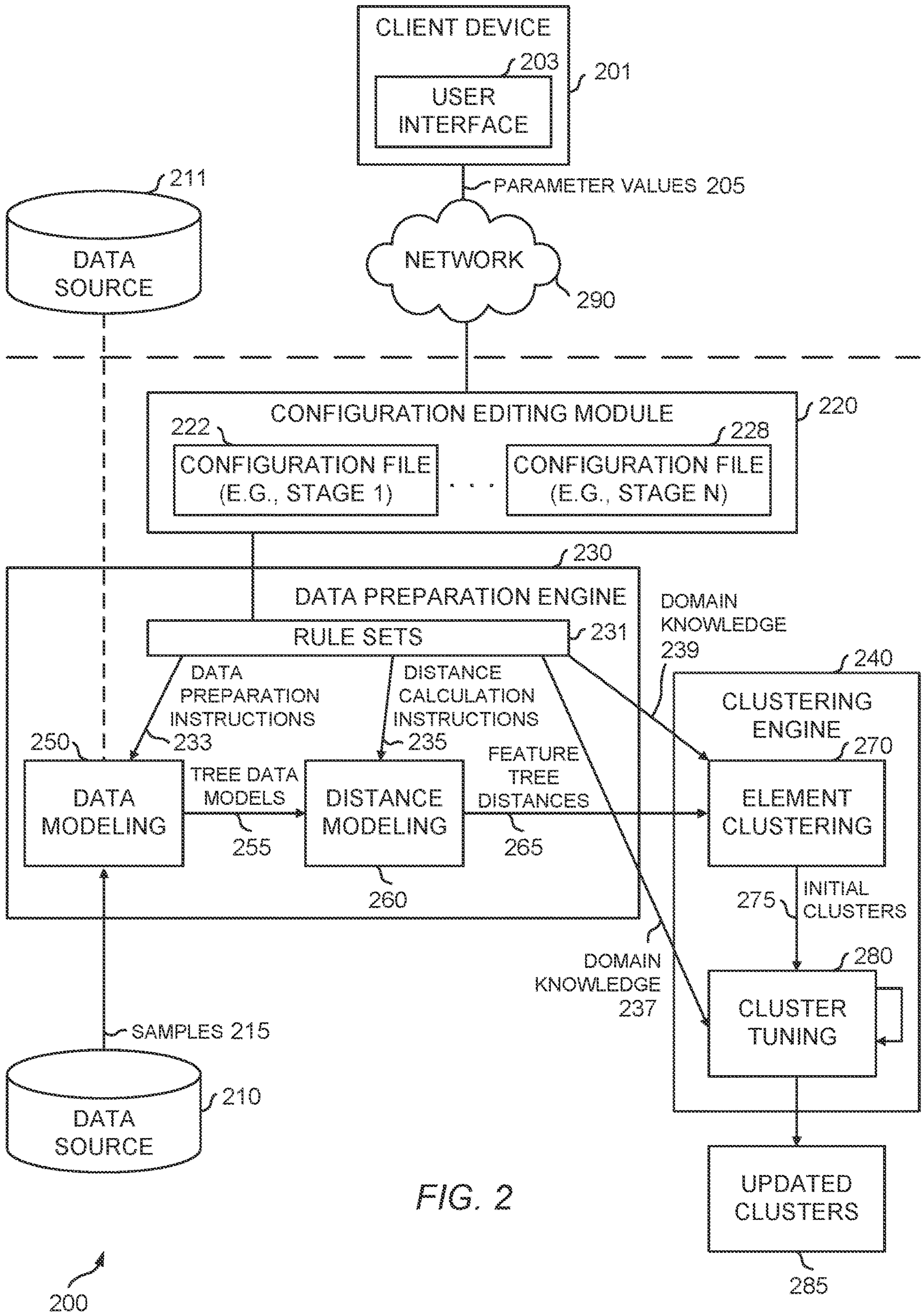
FIG. 2 depicts a diagrammatic representation of an example of an intelligent clustering system operating in a network computing environment according to some embodiments disclosed herein.

FIG. 2 depicts a diagrammatic representation of an example of an intelligent clustering system 200 operating in a network computing environment. In the example of FIG. 2, intelligent clustering system 200 operates in an enterprise computing environment protected by a firewall (as illustrated by a dashed line separating intelligent clustering system 200 and network 290).

Intelligent clustering system 200 can be communicatively connected to client devices (e.g., client device 201) and data sources (e.g., data source 210 which is internal to intelligent clustering system 200, data source 211 which is external to intelligent clustering system 200, etc.). A centralized database or big data storage 110 described above can be an example of data source 210. A WHOIS server, a WHOIS database, or a third-party data provider can be an example of data source 211.

As a non-limiting example, raw data on domains can be collected and/or aggregated from various data sources and stored in data source 210. For instance, domain attributes can be obtained and/or received from a WHOIS database and stored in data source 210. Such domain attributes can include, but are not limited to: registration dates, registrar identifiers, indications as to whether the domain was publicly or privately registered, email addresses associated with the registration, and/or IP addresses associated with domain hosting, etc. Data stored in data source 210 can be enriched through a preprocessing operation to include additional domain attributes, for example, a GA ID, an ASN ID, resolved (domain-to-IP) address information, page titles, etc.

In some embodiments, intelligent clustering system 200 includes configuration editing module 220, data preparation engine 230, and clustering engine 240. Although not shown, intelligent clustering system 200 may also include a prediction engine such as prediction engine 160 described above. The prediction engine can be implemented on the server side or the client side (in a lightweight version, discussed below). That is, like intelligent clustering system 100 described above, intelligent clustering system 200 may also operate in a mass-processing mode, in a stream-processing mode (in which new data can be obtained and/or streamed from data source 211, prepared by data preparation engine 230, assigned to existing or new cluster(s), and provided as input to clustering engine 240), or both concurrently.

In some embodiments, configuration editing module 220 is accessible by client device 201 through UI 203 on client device 201. Through UI 203, a user at client device 201 can provide parameter values 205 to configuration editing module 220. In turn, configuration editing module 220 can generate different configuration files 222, 228, each of which contains configuration-specific parameter values 205 for a user-defined objective or application (e.g., brand threats clustering, relevant domain clustering, etc.). An example of a configuration file in comma-separated values (CSV) format is described below with reference to FIG. 6.

Parameter values 205 represent the user's domain knowledge and can be used to guide data preparation engine 230 to generate various rule sets 231. Depending upon application or user-defined objective, rule sets 231 for qualified sample data filtering and significant cluster determination can vary from implementation to implementation.

As a non-limiting example, a rule inducing process and a rule evaluation process can be included in some embodiments of a relevant domain clustering process. This provides a light-weight approach for client-side prediction (e.g., prediction engine 160). The relevant domain clustering process may entail collecting a cluster representative data frame to form the most frequent or mean-value feature vector (more on this below) for each cluster, transforming the cluster data frame to form the greatest common feature vector and the least union feature vector for each cluster. In this way, given a cluster, the most frequent feature vector, the greatest common feature vector, and the least union feature vector can be determined. Accordingly, examples of rules that can be included in rule sets 231 can include:

a. Rule 1: For a feature tree of a new arrival data element, if the new feature tree is close enough to the representative feature tree of a cluster, it belongs to the cluster.
b. Rule 2: For a feature tree of a new arrival data element, if the new feature tree contains the greatest common feature vector of a cluster and the least union feature vector of the same cluster contains the new feature vector, it belongs to the cluster.

In this way, parameter values 205 and thus rule sets 231 can provide information about feature relevance, importance, and/or primacy to be applied in the data preparation process and clustering process. Parameter values 205 can also include the names of features to be considered, the distance type for each named feature (which governs what comparison function is to be used, for instance, if a feature data type is string, a string comparison function is used for distance calculation), an indicator for whether a feature is significant or not (for a particular configuration), a condition which defines whether a cluster is significant or not Parameter values 205 can further indicate removal of insignificant data elements, keeping only significant clusters.

Based on rule sets 231, data preparation engine 230 can provide different instructions to different modules 250, 260. For instance, data preparation engine 230 can provide data preparation instructions 233 to data modeling module 250 that instruct data modeling module 250 on how build tree data models 255. As illustrated in FIG. 2, distance calculation instructions 235 from data preparation engine 230 and tree data models 255 from data modeling module 250 are input into distance modeling module 260. In turn, distance modeling module 260 is operable to calculate the distance between corresponding features in the feature trees, the distance between two feature trees, etc. Feature tree distances 265 calculated by distance modeling module 260 are provided to clustering engine 240. Combined with domain knowledge 239 conveyed through rule sets 231, clustering engine 240 is operable to perform element clustering 270 which produces initial cluster 275.

In some embodiments, element clustering can include automatically grouping a set of data elements into one or more clusters. As a non-limiting example, element clustering can be performed based on element-by-element feature similarities based on a kernel function calculation. As discussed above, the automatic clustering process can be informed by feature weights, such that features with higher weight values have a greater influence on cluster formation. That is, two data elements sharing a highly weighted common feature would have a greater probability of being grouped together, as opposed to the sharing of features of a lower weight. Conversely, two data elements that do not share one or more highly weighted common features are less likely to be grouped into the same domain cluster.

In some embodiments, the clustering result from element clustering 270 can be post-processed to automatically separate insignificant clusters from significant clusters and to automatically label the clusters based on their characteristics extracted by following the rules from rule sets 231. Again, the rules are generated based on the configuration information in a configuration file. The configuration information and thus the rules incorporate domain knowledge through parameters values 205 based on which the configuration file is generated.

As discussed above, as new data elements are received by intelligent clustering system 200 and features (e.g., domain attributes) for the newly received data elements are automatically identified, clustering of the newly received data elements can be automatically performed. In some instances, this clustering can include the addition of one or more of the new data elements to one or more existing clusters. If a new data element does not belong to any existing clusters, a new cluster can be created with the new data element. In other aspects, existing clusters can be rearranged, for example, by removing one or more elements and forming new clusters, or combining existing clusters. Similarly, significant and insignificant clusters can be automatically identified and labeled. In some embodiments, any new data elements which have already been used to form clusters are removed from the dataset for the next stage clustering. This removal can improve processing performance for the next stage clustering due to the reduced size of data set.

Depending on the desired processing implementation, newly received data elements can be processed in a serial or parallel manner. For serial processing, after new data elements have been received, cluster formations can be evaluated/re-evaluated stage after stage. In parallel processing approaches, as new data elements and their corresponding features are added to the input dataset, cluster formations of all stages are performed at the same time. In either serial or parallel processing, each stage has its own configuration file with settings (e.g., parameter values 205) that reflect user-provided domain knowledge for the particular stage.

Referring to FIG. 2, in some embodiments, configuration file 222 can be a CSV file containing parameter values 205 provided through UI 203 on client device 201 to configuration editing module 220 by a domain expert or a user with domain knowledge. In some embodiments, data preparation engine can parse configuration file 222, extract parameter values 205 from configuration file 222, and construct rule sets 231 accordingly. Rule sets 231 can essentially be in the form of instructions 233, 235 that are consumable by data modeling module 250 and distance modeling module 260.

Based on data preparation instructions 233, data modeling module 250 can automatically identify whether any input samples 215 are insignificant based on their respective primary features and secondary features identified in configuration file 222. Insignificant samples for the current clustering stage can be discarded (in a parallel clustering mode) or carried over to the next stage (in a sequential clustering mode). Weightings indicated using configuration file 222, which guides to produce rule sets 231, can also be used to modify automatically generated tree data models 255 to produce feature tree distances 265 that represent weight-adjusted associations between data elements (e.g., domains). As used herein, distances, for example, based on feature weights, can be used to indicate a degree of similarity between data elements, based on their respectively associated features, including bundled features (which can have enhanced weights, as discussed above).

In some embodiments, a data element can be represented using a string of values, e.g., a vector, wherein each value represents a particular feature (or list of features) for the associated data element. Thus, each value could be a scalar or a vector with data type defined in a configuration file described above. Accordingly, feature vectors can be used to represent corresponding data elements (e.g., domains) in a dimensional space corresponding with the vector index length. In such implementations, clustering can be performed on the kernel function that measures similarity between any pair of vectors representing each domain, where vectors with closer vector space are more highly related and, therefore, are more likely to be associated with a common cluster.

As discussed above, once feature tree distances 265 are calculated, clustering engine 240 is operable to perform element clustering 270 based on domain knowledge 239 and feature tree distances 265. This produces initial clusters 275 which undergo cluster tuning 280. Insignificant cluster may become significant after cluster tuning 280. Significant cluster could also become insignificant after cluster tuning 280, although it is very unlikely.

Cluster tuning 280 is an iterative process which iteratively fine tunes the clustering according to domain knowledge 237 (which can be in the form of a rule set from rule sets 231). As illustrated in FIG. 2, cluster tuning 280 can initially adjust the clusters received from element clustering 270. When all data has been processed, all the stages have been processed (e.g., in a multi-stage mode), or timed out (e.g., in a stream-processing mode), clustering engine 240 produces a final clustering result (e.g., updated clusters 285).

Figure 3:
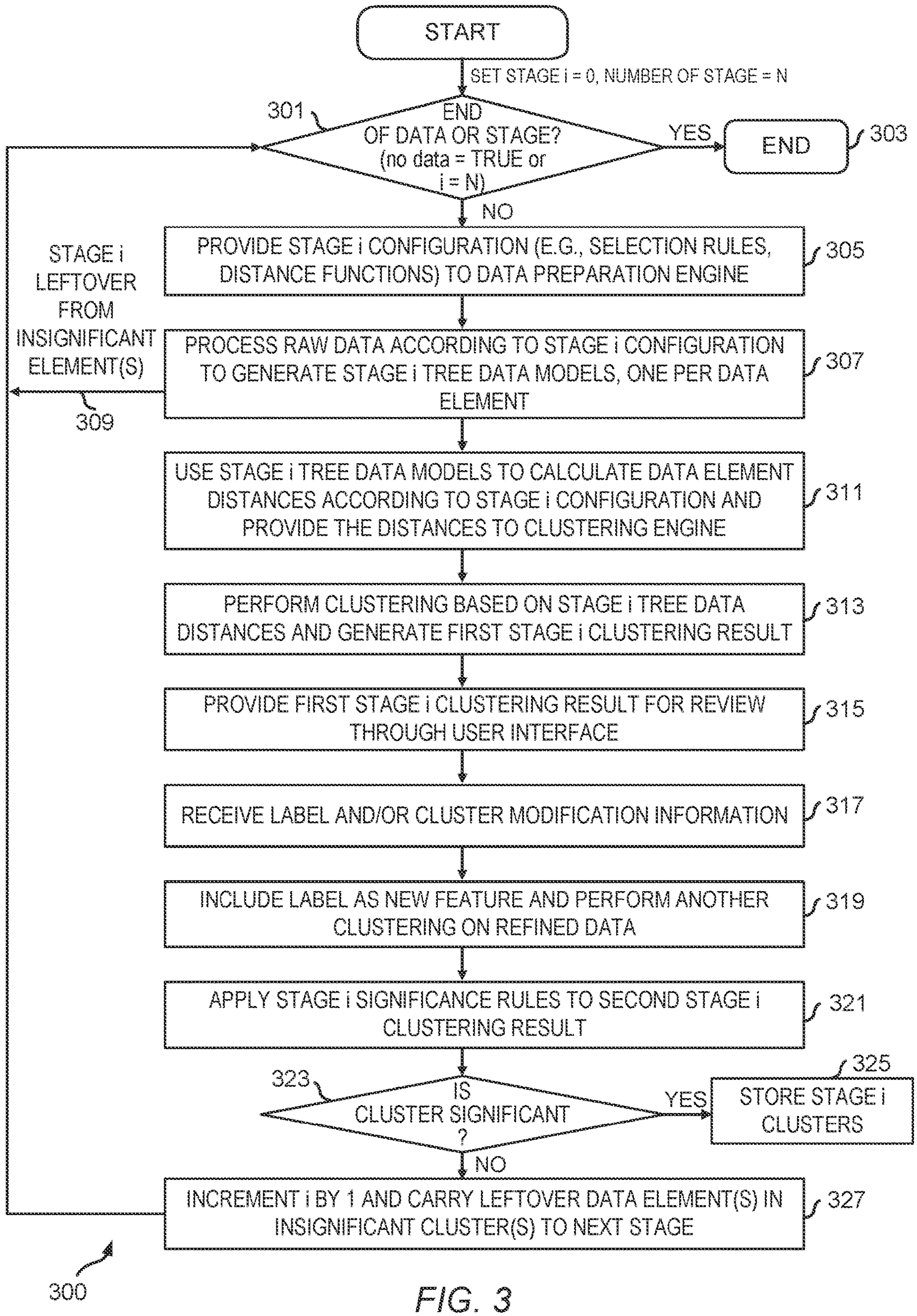
FIG. 3 depicts a diagrammatic representation of an example of a clustering workflow performed by an intelligent clustering system operating in a sequential clustering mode according to some embodiments disclosed herein.

FIG. 3 depicts a diagrammatic representation of an example of a clustering workflow 300 performed by an intelligent clustering system operating in a sequential clustering mode. Clustering workflow 300 has multiple stages and can begin with setting a stage variable (i) to zero. The number of stages (N) can vary from implementation to implementation.

The intelligent clustering system may first determine whether there is no more data to process or whether all the stages N have been processed (301). If either is true, clustering workflow 300 ends (303). Otherwise, clustering workflow 300 proceeds with providing a configuration file for the current stage (i) to the data preparation engine (305). The configuration file can include or otherwise define or specify rules (e.g., feature selection rules) and functions (e.g., distance functions) to be used for processing raw data at the current stage (i).

The raw data is processed (e.g., by the data preparation engine of the intelligent clustering system) according to the configuration file for the current stage (i) so as to generate tree data models, one per a data element (307). As described above, at this time, feature tree distances can also be calculated. In some cases, not all raw data are used. For instance, suppose a feature is marked by a domain expert (e.g., through UI 203 as one of parameter values 205) as a primary feature that must be present for the current stage configuration. If a data element lacks this primary feature, it is insignificant and not considered. Data not used at the current stage (e.g., leftover from insignificant element(s)) is carried over to the next stage (309).

Next, the intelligent clustering system uses the tree data models to calculate feature tree distances according to the current stage configuration and provides the distance matrix to the clustering engine (311). The clustering engine, in turn, performs element clustering described above based on the tree-to-tree distances generated for the current stage and generates a first clustering result for the current stage (313). The first clustering result for the current stage can be provided through a UI (e.g., UI 203 on client device 201) to a domain expert or a user with domain knowledge for review and/or correction.

Initially, the clustering engine does not have any label information on the raw data. After element clustering, the first clustering result for the current stage contains cluster labels. That is, through element clustering, each data element is automatically labeled as being associated with a particular cluster. The user can review the cluster labels in the first clustering result for the current stage and take appropriate action (e.g., moving data elements among clusters, splitting clusters and/or merging clusters to form new clusters, assign a label to a new cluster, change a cluster label, etc.). The user-provided modification information is received by the clustering engine (317). Any new or changed label assigned to a cluster is applied to all the data elements in the cluster in an auto-labeling process.

As described above, after receiving and processing new data, new cluster(s) may be created and the existent cluster(s) may split or/and merged. Based on the majority of element labels in a cluster, the cluster is relabeled accordingly and automatically. The label for each cluster and each single element can be manually overwritten and marked as "final". Once it is "final", the label becomes the most dominant feature (e.g., assigning a very strong weight) for future element clustering (319). This produces a second clustering result.

Again, as described above, the clustering engine can perform cluster tuning or optimization in an iterative process. In some embodiments, this process can include applying significance rules for the current stage to the second clustering result. The significance rules are based on user-provided domain knowledge on whether a cluster thus formed by the clustering engine is significant or insignificant (321). If a cluster is determined to be a significant one, it is stored (e.g., in a clusters data store or repository) (325). Otherwise, clustering workflow 300 increments the stage variable (i) by 1 and carry leftover data elements in insignificant cluster(s) to the next stage (327).

Figure 4A:
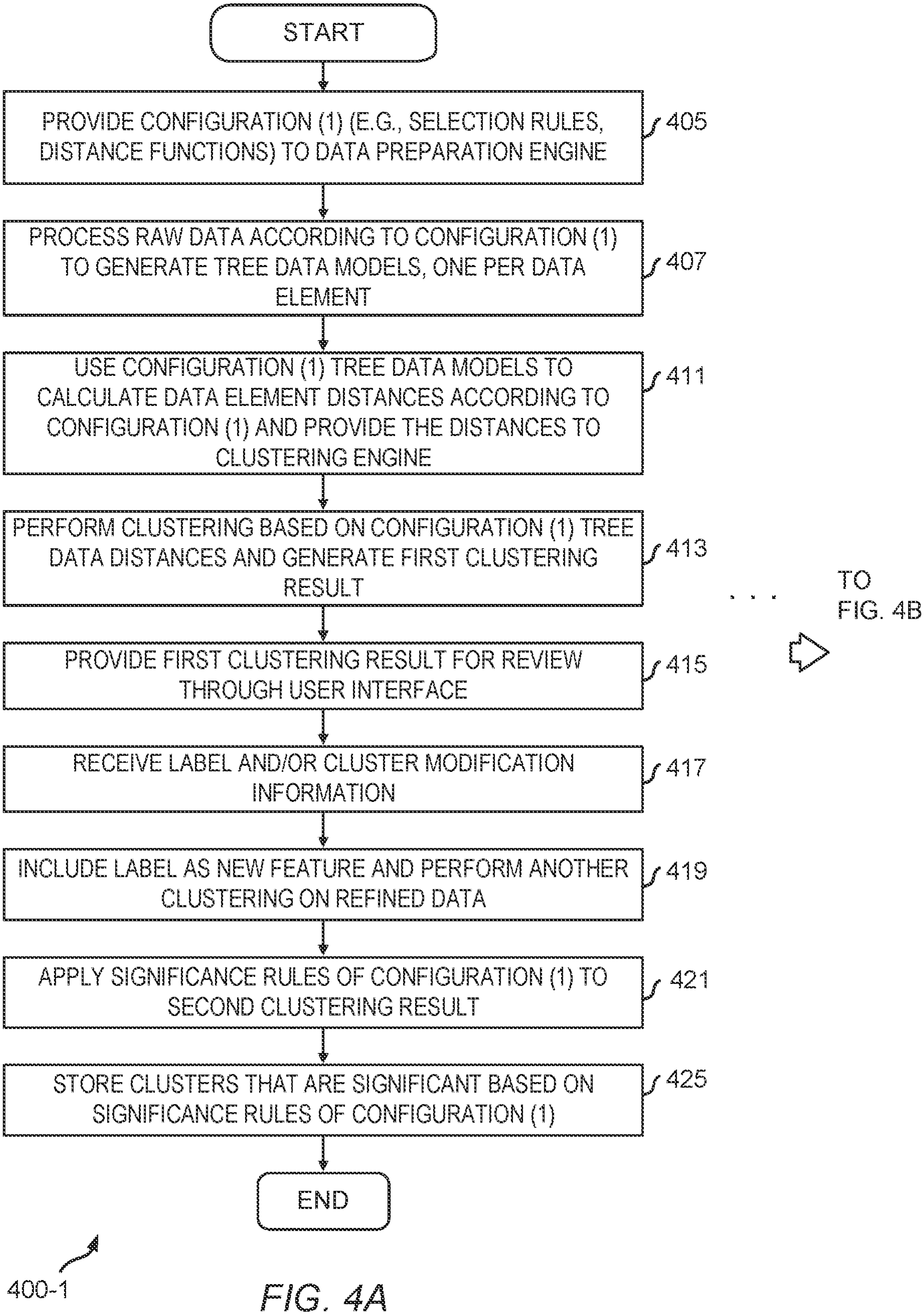
FIGS. 4A-4B together depict a diagrammatic representation of an example of a clustering workflow performed by an intelligent clustering system operating in a parallel clustering mode according to some embodiments disclosed herein.
Figure 4B:
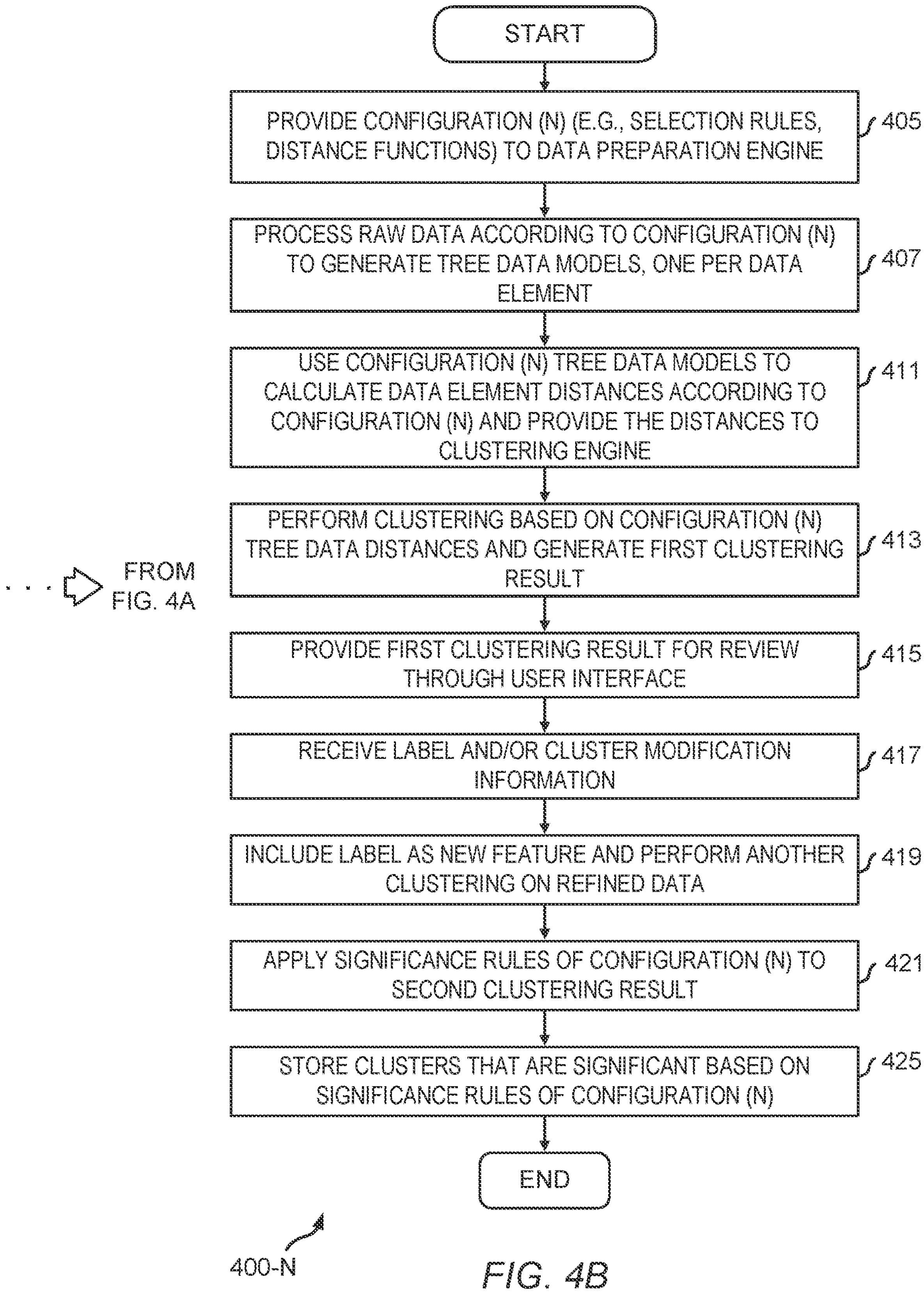

FIGS. 4A-4B together depict a diagrammatic representation of an example of clustering workflows 400-1, . . . 400-N performed by an intelligent clustering system operating in a parallel clustering mode according to some embodiments disclosed herein. In each of clustering workflows 400-1, . . . 400-N, steps 405, 407, 411, 413, 415, 417, 419, 421, and 425 are performed. These steps are similar to steps 305, 305, 307, 311, 313, 315, 317, 319, 321, and 325 described above. However, there are no stages within each clustering workflow. Further, leftover data from the current workflow is not carried over to another workflow.

Depending upon application, the clustering process in the mass-processing mode can either run sequentially (FIG. 3) or parallelly (FIGS. 4A-4B). Regardless of running sequentially or parallelly, the configuration information has to be set for each stage (FIG. 3) Or clustering workflow (FIGS. 4A-4B). The configuration editing module described above obtains instructions from the configuration information (e.g., parameter values 205 in configuration file 222) and instructions the data modeling module how to prepare feature trees, the distance modeling module how to measure tree distances, and the element clustering module and the cluster tuning module what domain knowledge to apply respectively.

As discussed above, the raw data is heterogeneous and has many different data types including, for instance, null, "string," "string list," "number," or "number list," etc. Accordingly, the traditional centroid (which is the average position of all points of an object) or medoids (which are representative objects of a cluster with a data set whose average dissimilarity to all the objects in the cluster is minimal) is not able to well represent a cluster. To address this issue, the invention combines the concept of centroid and medoids by way of mode, median, and mean in statistics to quantitatively define a representative of a cluster, which has the same metadata information as cluster elements. This means that the invention can utilize the same tree data modeling approach to describe either a data element or a cluster. FIG. 5 depicts a diagrammatic representation of an example of a feature tree 500 utilized by an intelligent clustering system disclosed herein to describe heterogenous input data according to some embodiments disclosed herein.

In the example of FIG. 5, feature tree 500 is a tree data model with the maximum level of a node=3 having a root node 501 that points to a set of user-defined features (510, 520, 530, 540), each of which points to a set of sub-trees of user-defined features, if any. For instance, node 510 has features 511, 513, and 515, while node 520 has none, node 530 has features 531, 533, and 535, and node 540 has features 541 and 543. As illustrated in FIG. 5, each node in feature tree 500, except root node 501, can be associated with a weight and a distance function (e.g., L2 norm, Levenshtein distance, etc.) for calculating a distance between feature trees representing different data elements. For example, two data elements can be described using the nonlinear data structure shown in FIG. 5. As described above, what distance function should be utilized (e.g., by distance modeling module 260) to calculate a distance between the corresponding leaf nodes of the two data elements under comparison can depend on the comparison type (or distance type) associated with the particular node.

Features associated with a particular data element can be represented as vectors ("feature vectors"). A vector is a mathematical structure that can be used to express a distance (and angle or direction) relative to a point of origin. In FIG. 5, the right-handed arrow over the letter "F" or "f" denotes a vector. Thus, in the example of FIG. 5, denotes a feature vector (($e_1$, $e_2$, ($e_6$, $e_7$)), $e_3$, ($e_4$, $e_2$, $e_5$), ($e_6$, $e_7$), . . . ) and each of $\vec{f}_1$, $f_2$, $\vec{f}_3$, and $\vec{f}_4$ denotes a feature vector for a bundle of features (e.g., $\vec{f}_1$, $\vec{f}_3$, or $\vec{f}_4$) or a feature (e.g., $\vec{f}_2$). ($\vec{f}_1$, $\vec{f}_2$, $\vec{f}_3$, $\vec{f}_4$, . . . , $\vec{f}_n$) is a vector of dimension n having an ordered collection of n components ($e_1$, $e_2$, ($e_6$, $e_7$)), $e_3$, ($e_4$, $e_2$, $e_5$), ($e_6$, $e_7$), . . . , and so on. Some of the n components of F (e.g., the first component ($e_1$, $e_2$, ($e_6$, $e_7$)), the third component ($e_4$, $e_2$, $e_5$), and the fourth component ($e_6$, $e_7$) are vectors themselves. For instance, the first component is a vector of dimension 3: $e_1$, $e_2$, ($e_6$, $e_7$), the third component is a vector of dimension 3: ($e_4$, $e_2$, $e_5$), and the fourth component is a vector of dimension 2: ($e_6$, $e_7$). These vectors can be referred to as "nested" feature vectors. As illustrated by the third component of the first component of $\vec{F}$, a nested feature vector can itself have no or at least one component that is a nested feature vector. Thus, FIG. 5 shows node 501 representing the root node of a tree with maximum level=3 (overall) that is a feature vector $\vec{F}$ with nodes 510, 520, 530, and 540 representing top-layer features (including bundled features) $\vec{f}_1$, $\vec{f}_2$, $\vec{f}_3$, and $\vec{f}_4$, respectively, and leaf nodes 511, 513, 515, 520, 531, 533, 535, 541, and 543 representing bottom-layer features $\vec{f}_{11}$, $\vec{f}_{12}$, $\vec{f}_{13}$, $f_2$, $f_{31}$, $f_{32}$, $f_{33}$, $f_{41}$, and $f_{42}$, respectively.

In this way, various features can be grouped, bundled, or otherwise associated in many ways. By enabling features to be grouped, corresponding feature conditions can be created and used to perform data processing and clustering. This unique data modeling approach to combining features to describe associated data elements in a highly nonlinear way provides greater flexibility in comparing features between data elements, and in forming meaningful clusters.

By way of example, to measure a similarity (i.e., a distance) between two data elements, the distance modeling module can first compare feature to feature (e.g., compare $f_{11}$ of a feature tree $FT_1$ representing domain A and $f_{11}$ of a feature tree $FT_2$ representing domain B) and calculate a feature-to-feature distance (between $f_{11}$ of $FT_1$ and $f_{11}$ of $FT_2$). The distance modeling module can then combine all the feature-to-feature distances calculated for the leaf nodes and determine individual parent feature distances (e.g., between $\vec{f}_1$ of $FT_1$ and $\vec{f}_1$ of $FT_2$). The calculated feature distances can then be used to determine an overall feature vector distance (e.g., between $\vec{F}$ of $FT_1$ and $\vec{F}$ of $FT_2$) which, in turn, can be used to define a similarity (or dissimilarity) between the two samples.

Different distance functions can be utilized to calculate the feature-to-feature distances. For example, if a feature is numerical, a number to number distance function can be used. For a text feature, a text to text distance function can be used. For an image feature, an image to image distance function can be used. For a date comparison, the similarity would be higher when the dates are closer and lower when they are farther apart.

Some prior data modeling approaches describe data using vectors. However, these prior approaches describe data attributes separately and independently from one another. For complex or heterogenous data, such prior data modeling approaches do not reflect the relationships among features of interest. For example, some data elements may have some associated features that are synergistic to each other (e.g., have some special association information) and should be considered as a single feature (by grouping or bundling them together beforehand). The tree data model described above provide a new way to describe big, heterogenous data in a more precise and yet flexible way.

As described above, each feature tree is constructed based on data preparation instructions which reflect user-provided domain knowledge, in the form of parameter values, including what features are of interest, how relationships between and among the features should be modeled, which feature is expected to be present in a data element, what weight, if any, should be assigned to what feature, what distance type and hence distance function is to be used, and so on.

FIG. 6 shows an example of a portion of a configuration file 600 (e.g., "Param.csv") that contains user-defined features (e.g., classification date, category, seed, domain, state, mx_state, etc.), distance type (e.g., text string comparison ("str_comp"), ngrams distance ("ngrams_dist"), date distance ("date_dist"), DNS IP address distance ("ip_dist"), registrant email address distance ("set_of_eml_dist"), etc.), distance factor, bundle distance factor, and so on. In this example, a distance factor represents a user-assigned weight given to a particular feature and a bundle distance factor represents a user-assigned weight to enhance a bundle of features.

In the example of FIG. 6, the feature—registrant email address ("registrant_email"), is considered (based on domain knowledge) to be an important feature and, therefore, the user has marked it with "p" (which stands for "primary") and gave it a weight of 3. A primary feature is expected to be in the data. If a data element does not have this primary feature, it is not considered in any clustering operation that is based on configuration file 600.

As illustrated in FIG. 6, a feature may be marked with "x" which means that it should be included. In the example of FIG. 6, the feature—an IP ASN ("ip_asn"), is given a weight of 2 (per the first bundle distance factor) when it is bundled with the primary feature. The weight is enhanced to 3 (per the second bundle distance factor) when it is bundled with the primary feature and another important feature marked with "x" ("registrar_name"). In this way, the user can describe/model the different relationships these features may have. Further, the user can describe features in a flexible way. For instance, sometimes a data type can be set for a set of features or a single feature. The user can describe how features should be associated with each other using union or interception.

Returning to FIG. 2, as a non-limiting example, parameter values 205 can include weights for various features, each weight quantitatively indicating a relative feature importance or relevance. For instance, a domain registrant email address may be highly indicative of a correlation between separate domain registrations (names) as compared to a geo-location indicating a general region where a registration occurred. Accordingly, a domain expert can set the distance factor (a weight) for a relevant feature (which, in this example, is the domain registrant email address) that is higher than the distance factor for a less relevant feature (which, in this example, is the geo-location of where the registration occurred). In this way, the domain expert's domain knowledge can guide data preparation engine 230 to give the relevant feature (e.g., the domain registrant email address) the greater priority (weighting) over the less relevant feature (e.g., the geo-location). Further, when predefined bundled features are similar between two data elements, their corresponding weights can be enhanced. As such, expert knowledge (e.g., knowledge provided by a cyber-security professional), can be used to inform associations/distances between various domains and help to generate better clustering results.

In some embodiments, the weights can be normalized on an interval [0, 1], where 0 indicates a weak relationship between features, and 1 indicates a strong relationship.

Other weighting quantification intervals may be implemented without deviating from the scope of the invention disclosed herein.

Through configuration file 600, the user can also define insignificance rules (e.g., "not sgnft sample") to rule out insignificant data elements that the user is not interested in view of an objective (e.g., if a registrant email address contains (in, @ or .)). The user can also define significance rules ("sgnft cluster 1", "sgnft cluster 2") to identify significant clusters (e.g., "(==, 1)", "(==, f4||1), (==, f4|2 and f5||), etc.). If a cluster does not meet a significance rule, it is not considered as significant and thus is not considered and/or stored. That is, whether a cluster generated by a clustering process ends up in a clustering result can depend on whether the cluster meets the objective reflected in configuration file 600 through user-provided parameter values based on a user's domain knowledge.

As discussed above, each clustering stage (in the sequential clustering mode or the parallel clustering mode can have its own configuration. FIG. 6 exemplifies how to set up configuration information for such a clustering stage. Each stage has a configuration file associated therewith.

The hybrid approach described above combines the strength inheriting from both human domain knowledge and machine learning technologies in a user-friendly way to optimize clustering quality. The intelligent clustering architecture described above can be generalized to solve many clustering-related problems once the sample data becomes accessible and the corresponding feature/attributes set is selected. The multi-stage clustering processing methodology described above further enhances the capability to model and solve complicated clustering-related problems. Further, the dual-mode combines the benefits from both mass-processing to accurately build up a clustering/prediction model, and stream-processing to analyze samples in a very high throughput rate. Accordingly, the invention disclosed herein can provide many advantages, including:

- The dual-mode clustering engine allows a nearly real-time analysis after massively processing the initial large number of samples. The computational complexity becomes linearly dependent on the number of clusters, or the number of samples that have been processed after aging out. The clustering result adapts itself to the change of available samples, and is always updated up to a current time point.
- The multi-stage clustering processing method provides the power to solve the complicated clustering problems which the traditional clustering algorithms cannot do. For example, brand threats clustering can be performed in the sequential clustering mode with five stages according to, stage after stage, different domain knowledge settings, and sample data which are not clustered can be carried over, also stage after stage. As another example, relevant domains clustering can be based on the parallel clustering mode. To cluster sample data from n seeds, the same samples from the same seed can be clustered separately in parallel, with n parallel stages and with a different configuration per stage.
- The traditional machine learning training is not necessary. The clustering engine can use all the available data to optimize clustering results for predicting new arrival samples and then using the further results to perform self-adjusting/tuning. To this end, the learning can be unsupervised. Further, the number of clusters need not be predefined as it is determined by a similarity threshold. Moreover, the raw data does not need to be labeled for the initial clustering. This invention can be applied to automate sample labeling.
- By defining a feature vector through a nonlinear tree structure and describing heterogenous features of interest through a uniform data object, the modeling power and accuracy to describe sample data can be enhanced. The shape of a cluster is not necessary to be spherical as it is determined by the function of feature/attribute weights and distance functions dictated by user-provided domain knowledge. After the data modeling, the data is ready for various machine learning/data mining technologies for further analysis.
- The invention provides a dynamical configuration system that allows users to input their domain knowledge in terms of sample data values directly for specific objectives or applications. Features and the associative property attributes are dynamic, and domain knowledge becomes editable. This user-interactive data modeling and domain knowledge input layer, combined with machine learning methods, results in an intelligent hybrid clustering engine that can learn on its own as well as incorporating user-provided domain knowledge which, in turn, improves the effectiveness and efficiency on solving clustering problems with digital-risk related data.
- The invention's use of a function of both centroid and medoid to describe a cluster representative for sample feature values with heterogeneous data type is more accurate than using either one alone. The novel data modeling approach and the new definition of cluster representative streamline the clustering algorithm for practical predictions and make the clustering process highly scalable (e.g., secondary clustering).
- The scalable clustering architecture enables implementations to fit into a distributed computing framework (e.g., APACHE SPARK) seamlessly. For example, sample data from a data source can be read in the form of a sample dataframe (which is a two-dimensional labeled data structure with columns of potentially different data types). A user can define functions by passing the sample dataframe as an argument for calculating the distance between samples and forming a distance dataframe. The distance dataframe can then be further transformed to a cluster dataframe by applying a spectral clustering algorithm, and a cluster representative dataframe using a proprietary cluster representative induction algorithm. Either one can be used for new sample clustering/prediction in the sequential clustering mode described above. If needed, a representative dataframe can be used for secondary clustering to from a set of clusters of clusters.
- The invention utilizes a new rule induction algorithm to build a one-to-one mapping between a cluster and a rule. Each rule uniquely determines the cluster to which the samples actually belong. This light-weight approach enables a prediction engine to be implemented on the client side to efficiently cluster/predict a new arrival sample and send the predictions to the cluster engine on the server side.

In conclusion, the invention provides a dual-mode clustering engine which performs effective and efficient clustering; a multi-stage clustering method which models and solves the complicated clustering problems; a hybrid approach which combines the strengths of user domain knowledge and machine learning power; a light-weight rule-based approach which allows a prediction engine to be implemented on the client side; and a sophisticated tree structure which allows heterogenous data such as digital-risk related data to be described in a more accurate and uniform way. The invention does not require a priori knowledge of the shape of the cluster or the number of clusters.

Example Implementation

An intelligent clustering system was implemented using Python programming language and ran on a cloud-based big data processing and analysis platform with one master instance (4 vCore, 30.5 GiB memory, 32 Gib EBS only storage) together with six Core instances (8 vCore, 61 GiB memory, 32 Gib EBS only storage).

The intelligent clustering system utilizes the data preparation process described above to prepare feature vectors and calculate feature vector distances. The domain knowledge is used in the data preparation stage. For performance reasons, the intelligent clustering system in this implementation combines known clustering algorithms such as spectral clustering and Graph Frames (which is a graph processing library for APACHE SPARK) with a proprietary clustering algorithm. However, any clustering algorithm can be adapted for use with the invention and the actual clustering algorithm used may vary from implementation to implementation.

The intelligent clustering system is utilized for two applications (objectives): threat actors identification and relevant domain detection. One objective is processed in the sequential clustering mode and the other objective is processed in the parallel clustering model.

For threat actors identification, raw data associated with domain names is collected from various data sources. Based on the raw data, the following features are identified based on domain knowledge:

Web page content features (feature set 1)

Domain registration features (feature set 2)

Infrastructure-related features (feature set 3)

The identified features are extracted and prepared. In the sequential clustering mode, clustering can be first performed on all the domains in the raw data that have feature set 1. This is the first stage. Domains that are not used to form significant clusters are carried over to the next stage in which they are clustered based on feature set 2. Again, domains that are not used to form significant clusters in this stage are carried over to the next stage in which they are clustered based feature set 3.

For relevant domain detection, web page content is extracted and used to prepare a feature vector for each domain belonging to the seeds of interest (e.g., "sprint.com", "chase.com, "swift.com", "coach.com", etc.). Each seed has its own dataset, a parameter (configuration) file, and associated clustering rule(s). The datasets are not correlated each other and do not belong to the same cluster. The same sample data is processed for all the seeds of interest in the parallel clustering mode. So, if there are five seeds, there can be five parallel clustering stages based on five different configuration files.

Because each configuration file incorporates the user-provided domain knowledge for a particular seed, the clustering results are formed (serially or parallelly) under the guideline of a user. For example, FIG. 7 shows a clustering result 700 based on a feature set of "registrant email", "registrant name", and "IP ASN"; FIG. 8 shows a clustering result 800 based on a feature set of "GA Tracker ID", "registrant name", and "IP ASN"; FIG. 9 shows a clustering result 900 based on a feature set of "DNS IP address", "registrant name", and "IP ASN"; and FIG. 10 shows a clustering result 1000 based on a feature set of "domain" (from registrant email), "registrant name", and "IP ASN".

For threat actors identification, the objective is to find a potential attacker that is trying to register multiple domains and trying to attack a specific seed. By analyzing these clustering results, a network security specialist or a user with domain knowledge can uncover a hidden pattern that is usually not easily detectable. For example, clustering result 700 shows that two registrant names having the same registrant email address are associated with the registration of multiple domains containing the name of the seed "company.com". This shows a pattern of a potential attack in which an actor or a group of actors is trying to hack to gain access to the seed domain.

The intelligent clustering system was also used to cluster non-HTTP malware data to match their binary malware protocols, and it successfully helped identify candidate clusters for automatic signature generation. Additionally, the intelligent clustering system was applied to cluster malicious emails for APT campaign discovery. The discovery result was confirmed to be valid by malware researchers. By manually evaluating these resultant clusters, the implementation has shown that the intelligent clustering system disclosed herein can help identify threat actors and separate relevant domains from non-relevant domains for a given seed in an efficient and effective manner.

Figure 11:
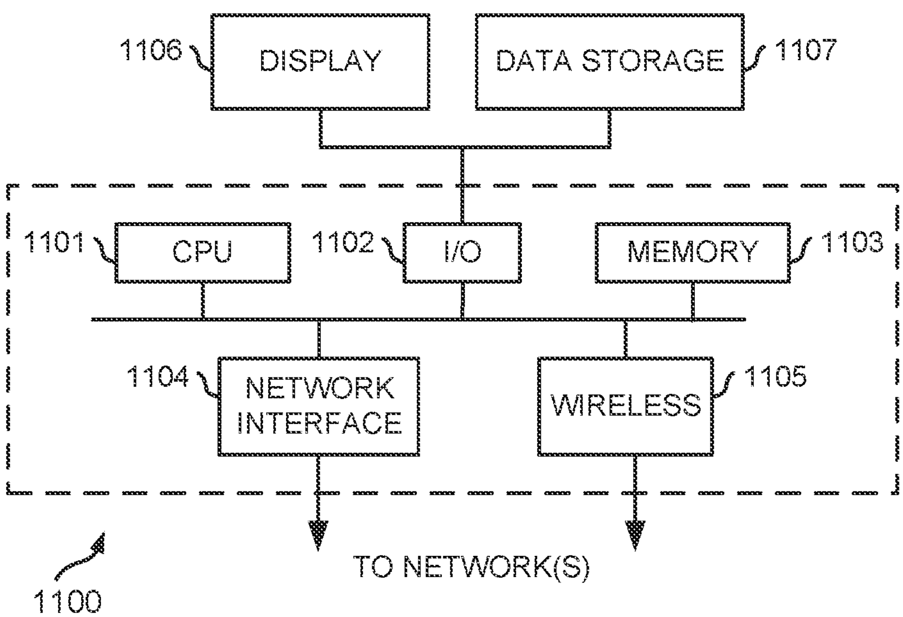
FIG. 11 depicts a diagrammatic representation of a data processing system for implementing an intelligent clustering system disclosed herein.

FIG. 11 depicts a diagrammatic representation of a data processing system for implementing a location threat monitoring system disclosed herein. As shown in FIG. 11, data processing system 1100 may include one or more central processing units (CPU) or processors 1101 coupled to one or more user input/output (I/O) devices 1102 and memory devices 1103. Examples of I/O devices 1102 may include, but are not limited to, keyboards, displays, monitors, touch screens, printers, electronic pointing devices such as mice, trackballs, styluses, touch pads, or the like. Examples of memory devices 1103 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 1100 can be coupled to display 1106, information device 1107 and various peripheral devices (not shown), such as printers, plotters, speakers, etc. through I/O devices 1102. Data processing system 1100 may also be coupled to external computers or other devices through network interface 1104, wireless transceiver 1105, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:

receiving, by a computer, data streamed from a data source, the data containing a data element;

preparing, by the computer, the data element, the preparing including generating a tree data model for the data element and calculating a tree distance between the data element and a cluster representative utilizing the tree data model;

based at least on the tree distance, generating, by the computer, a prediction for the data element, wherein the computer has been trained by machine learning to recognize and cluster data elements in view of similarities or differences between features of the data elements, wherein the prediction comprises an assignment of the data element to a cluster, the cluster being an existent cluster or a new cluster containing the data element, wherein the existent cluster comprises an existent data element; and providing, by the computer, the cluster and the prediction to a clustering engine, wherein the clustering engine performs a clustering tuning operation on the cluster in an iterative process based at least in part on the prediction, wherein the iterative process comprises applying a significance rule to the cluster so as to determine whether the cluster is significant or insignificant to a given objective, and wherein the clustering tuning operation updates the cluster for the given objective.

2. The method according to claim 1, further comprising:

providing the updated cluster to a client device or a prediction engine, wherein the prediction engine utilizes the updated cluster to increase an accuracy rate in generating future cluster assignment predictions.

3. The method according to claim 1, wherein the clustering tuning operation is an iterative self-tuning process and wherein the clustering tuning operation produces the updated cluster when a condition is met to end the iterative self-tuning process.

4. The method according to claim 1, further comprising:

providing a configuration editing module user interface to a client device, wherein the configuration editing module user interface include interactive user interface elements for describing parameter values that reflect the user-provided domain knowledge on the given objective.

5. The method according to claim 4, wherein a rule set is generated from the parameter values, wherein the rule set is for filtering based on a greatest common feature vector between the new cluster and the existent cluster.

6. The method according to claim 1, wherein the clustering tuning operation comprises:

adding the data element to the existent cluster to produce the updated cluster; and reassigning the existent data element based on a feature of the existent data element, wherein the existent data element is reassigned to a second existent cluster in a group of existent clusters, wherein the group of existent clusters comprises the updated cluster and the second existent cluster.

7. The method according to claim 1, wherein the data element comprises a plurality of features, wherein the tree data model comprises a root node representing a feature vector having an ordered collection of components representing the plurality of features, wherein the root node points, through relationship paths, to a set of user-defined features, each of which points, through additional relationship paths, to a set of sub-trees of user-defined features, wherein each node in the tree data model except the root node is associated with a weight and a distance function, and wherein the plurality of features, the relationship paths, the weight, and the distance function are defined in parameter values that reflect the user-provided domain knowledge on the given objective.

8. An intelligent clustering system, comprising:

a processor;

a non-transitory computer-readable medium; and stored instructions translatable by the processor for:

receiving data streamed from a data source, the data containing a data element;

preparing the data element, the preparing including generating a tree data model for the data element and calculating a tree distance between the data element and a cluster representative utilizing the tree data model;

based at least on the tree distance, generating a prediction for the data element, wherein the intelligent clustering system has been trained by machine learning to recognize and cluster data elements in view of similarities or differences between features of the data elements, wherein the prediction comprises an assignment of the data element to a cluster, the cluster being an existent cluster or a new cluster containing the data element, wherein the existent cluster comprises an existent data element; and providing the cluster and the prediction to a clustering engine, wherein the clustering engine performs a clustering tuning operation on the cluster in an iterative process based at least in part on the prediction, wherein the iterative process comprises applying a significance rule to the cluster so as to determine whether the cluster is significant or insignificant to a given objective, and wherein the clustering tuning operation updates the cluster for the given objective.

9. The intelligent clustering system of claim 8, wherein the stored instructions are further translatable by the processor for:

providing the updated cluster to a client device or a prediction engine, wherein the prediction engine utilizes the updated cluster to increase an accuracy rate in generating future cluster assignment predictions.

10. The intelligent clustering system of claim 8, wherein the clustering tuning operation is an iterative self-tuning process and wherein the clustering tuning operation produces the updated cluster when a condition is met to end the iterative self-tuning process.

11. The intelligent clustering system of claim 8, wherein the stored instructions are further translatable by the processor for:

providing a configuration editing module user interface to a client device, wherein the configuration editing module user interface include interactive user interface elements for describing parameter values that reflect the user-provided domain knowledge on the given objective.

12. The intelligent clustering system of claim 8, wherein a rule set is generated from the parameter values, wherein the rule set is for filtering based on a greatest common feature vector between the new cluster and the existent cluster.

13. The intelligent clustering system of claim 8, wherein the clustering tuning operation comprises:

adding the data element to the existent cluster to produce the updated cluster; and reassigning the existent data element based on a feature of the existent data element, wherein the existent data element is reassigned to a second existent cluster in a group of existent clusters, wherein the group of existent clusters comprises the updated cluster and the second existent cluster.

14. The intelligent clustering system of claim 8, wherein the data element comprises a plurality of features, wherein the tree data model comprises a root node representing a feature vector having an ordered collection of components representing the plurality of features, wherein the root node points, through relationship paths, to a set of user-defined features, each of which points, through additional relationship paths, to a set of sub-trees of user-defined features, wherein each node in the tree data model except the root node is associated with a weight and a distance function, and wherein the plurality of features, the relationship paths, the weight, and the distance function are defined in parameter values that reflect the user-provided domain knowledge on the given objective.

15. A computer program product comprising a non-transitory computer-readable medium storing instructions translatable by a processor of a computer for:

receiving data streamed from a data source, the data containing a data element;

preparing the data element, the preparing including generating a tree data model for the data element and calculating a tree distance between the data element and a cluster representative utilizing the tree data model;

based at least on the tree distance, generating a prediction for the data element, wherein the computer has been trained by machine learning to recognize and cluster data elements in view of similarities or differences between features of the data elements, wherein the prediction comprises an assignment of the data element to a cluster, the cluster being an existent cluster or a new cluster containing the data element, wherein the existent cluster comprises an existent data element; and providing the cluster and the prediction to a clustering engine, wherein the clustering engine performs a clustering tuning operation on the cluster in an iterative process based at least in part on the prediction, wherein the iterative process comprises applying a significance rule to the cluster so as to determine whether the cluster is significant or insignificant to a given objective, and wherein the clustering tuning operation updates the cluster for the given objective.

16. The computer program product of claim 15, wherein the instructions are further translatable by the processor for:

providing the updated cluster to a client device or a prediction engine, wherein the prediction engine utilizes the updated cluster to increase an accuracy rate in generating future cluster assignment predictions.

17. The computer program product of claim 15, wherein the instructions are further translatable by the processor for:

providing a configuration editing module user interface to a client device, wherein the configuration editing module user interface include interactive user interface elements for describing parameter values that reflect the user-provided domain knowledge on the given objective.

18. The computer program product of claim 17, wherein a rule set is generated from the parameter values, wherein the rule set is for filtering based on a greatest common feature vector between the new cluster and the existent cluster.

19. The computer program product of claim 15, wherein the clustering tuning operation comprises:

adding the data element to the existent cluster to produce the updated cluster; and reassigning the existent data element based on a feature of the existent data element, wherein the existent data element is reassigned to a second existent cluster in a group of existent clusters, wherein the group of existent clusters comprises the updated cluster and the second existent cluster.

20. The computer program product of claim 15, wherein the data element comprises a plurality of features, wherein the tree data model comprises a root node representing a feature vector having an ordered collection of components representing the plurality of features, wherein the root node points, through relationship paths, to a set of user-defined features, each of which points, through additional relationship paths, to a set of sub-trees of user-defined features, wherein each node in the tree data model except the root node is associated with a weight and a distance function, and wherein the plurality of features, the relationship paths, the weight, and the distance function are defined in parameter values that reflect the user-provided domain knowledge on the given objective.

* * * * *